US 8,295,818 B2

(12) United States Patent
Palnati et al.

(10) Patent No.: US 8,295,818 B2
(45) Date of Patent: Oct. 23, 2012

(54) BROADCASTING IN WIRELESS SYSTEMS

(75) Inventors: Prasasth R. Palnati, Westford, MA (US); Gopal Harikumar, Westford, MA (US); Roshan M. Rao, Acton, MA (US); Woojune Kim, Arlington, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 289 days.

(21) Appl. No.: 11/229,180

(22) Filed: Sep. 15, 2005

(65) Prior Publication Data

US 2007/0058628 A1 Mar. 15, 2007

(51) Int. Cl.
*H04M 3/42* (2006.01)
*H04L 29/06* (2006.01)

(52) U.S. Cl. .................. 455/414.2; 455/414.3
(58) Field of Classification Search .......... 455/454, 455/414.1–414.3, 423, 442, 502, 422.1; 370/432, 370/389–390, 312, 310.2
See application file for complete search history.

(56) References Cited

U.S. PATENT DOCUMENTS

| 6,704,576 | B1 * | 3/2004 | Brachman et al. ........... 455/503 |
| 6,711,144 | B1 | 3/2004 | Kim et al. |
| 6,731,618 | B1 | 5/2004 | Chung et al. |
| 6,741,862 | B2 | 5/2004 | Chung et al. |
| 6,781,999 | B2 | 8/2004 | Eyuboglu et al. |
| 7,170,871 | B2 | 1/2007 | Eyuboglu et al. |
| 7,200,391 | B2 | 4/2007 | Chung et al. |
| 7,242,958 | B2 | 7/2007 | Chung et al. |
| 7,277,446 | B1 | 10/2007 | Abi-Nassif et al. |
| 7,283,815 | B2 * | 10/2007 | Kim et al. ...................... 455/423 |
| 7,299,278 | B2 | 11/2007 | Ch'ng |
| 7,493,108 | B2 * | 2/2009 | Beming et al. ................ 455/418 |
| 2002/0191567 | A1 * | 12/2002 | Famolari et al. .............. 370/335 |
| 2002/0196749 | A1 | 12/2002 | Eyuboglu et al. |
| 2003/0100311 | A1 | 5/2003 | Chung et al. |
| 2005/0128996 | A1 * | 6/2005 | Yoshida et al. ............... 370/349 |
| 2005/0213555 | A1 | 9/2005 | Eyuboglu et al. |
| 2005/0243749 | A1 | 11/2005 | Mehrabanzad et al. |
| 2005/0245279 | A1 | 11/2005 | Mehrabanzad et al. |
| 2006/0034202 | A1 * | 2/2006 | Kuure et al. .................. 370/312 |
| 2006/0067422 | A1 | 3/2006 | Chung |
| 2006/0067451 | A1 | 3/2006 | Pollman et al. |
| 2006/0126509 | A1 | 6/2006 | Abi-Nassif et al. |
| 2006/0126556 | A1 | 6/2006 | Jiang et al. |
| 2006/0159045 | A1 | 7/2006 | Ananthaiyer et al. |
| 2006/0234755 | A1 * | 10/2006 | Jonsson et al. ................ 455/525 |
| 2006/0240782 | A1 | 10/2006 | Pollman et al. |
| 2006/0291420 | A1 | 12/2006 | Ng |
| 2006/0294241 | A1 | 12/2006 | Cherian et al. |
| 2007/0026884 | A1 | 2/2007 | Rao |
| 2007/0058628 | A1 | 3/2007 | Palnati et al. |
| 2007/0077948 | A1 | 4/2007 | Sharma et al. |

(Continued)

OTHER PUBLICATIONS

Bender, P. et al., "CDMA/HDR: A Bandwith-Efficient High-Speed Wireless Data Service for Nomadic Users", IEEE Communications Magazine, Jul. 2000 (8 pages).

(Continued)

*Primary Examiner* — Melody Mehrpour
*Assistant Examiner* — Emem Stephen
(74) *Attorney, Agent, or Firm* — Fish & Richardson P.C.

(57) ABSTRACT

In a radio access network, techniques for multicasting information from a radio network controller to radio nodes. The techniques further include broadcasting the information from the radio nodes to mobile access terminals. The information can include content to be delivered to the access terminals.

29 Claims, 8 Drawing Sheets

U.S. PATENT DOCUMENTS

| | | | |
|---|---|---|---|
| 2007/0097916 | A1 | 5/2007 | Eyuboglu et al. |
| 2007/0115896 | A1 | 5/2007 | To et al. |
| 2007/0140172 | A1 | 6/2007 | Garg et al. |
| 2007/0140184 | A1 | 6/2007 | Garg et al. |
| 2007/0140185 | A1 | 6/2007 | Garg et al. |
| 2007/0140218 | A1 | 6/2007 | Nair et al. |
| 2007/0155329 | A1 | 7/2007 | Mehrabanzad et al. |
| 2007/0220573 | A1 | 9/2007 | Chiussi et al. |
| 2007/0230419 | A1 | 10/2007 | Raman et al. |
| 2007/0238442 | A1 | 10/2007 | Mate et al. |
| 2007/0238476 | A1 | 10/2007 | Raman et al. |
| 2007/0242648 | A1 | 10/2007 | Garg et al. |
| 2007/0248042 | A1 | 10/2007 | Harikumar et al. |
| 2008/0003988 | A1 | 1/2008 | Richardson |
| 2008/0013488 | A1 | 1/2008 | Garg et al. |
| 2008/0062925 | A1 | 3/2008 | Mate et al. |
| 2008/0065752 | A1 | 3/2008 | Ch'ng et al. |
| 2008/0069020 | A1 | 3/2008 | Richardson |
| 2008/0069028 | A1 | 3/2008 | Richardson |
| 2008/0076398 | A1 | 3/2008 | Mate et al. |
| 2008/0117842 | A1 | 5/2008 | Rao |
| 2008/0119172 | A1 | 5/2008 | Rao et al. |
| 2008/0120417 | A1 | 5/2008 | Harikumar et al. |
| 2008/0139203 | A1 | 6/2008 | Ng et al. |
| 2008/0146232 | A1 | 6/2008 | Knisely |
| 2008/0151843 | A1 | 6/2008 | Valmikam et al. |
| 2008/0159236 | A1 | 7/2008 | Ch'ng et al. |
| 2008/0162924 | A1 | 7/2008 | Chinitz et al. |
| 2008/0162926 | A1 | 7/2008 | Xiong et al. |

OTHER PUBLICATIONS

3GPP2, "Draft Baseline Text for 1xEV-DO," Aug. 21, 2000 (293 pages).

$3^{rd}$ Generation Partnership Project 2 (3GPP2), "CDMA2000 High Rate Broadcast-Multicast Packet Data Air Interface Specification", 3GPP2 C.S0054-0, version 1.0, Feb. 2004 (101 pages).

$3^{rd}$ Generation Partnership Project 2 (3GPP2), "Broadcast and Multicast Service in cdma2000 Wireless IP Network", 3GPP2 X.S0022-A, version 1.0, Feb. 16, 2007 (143 pages).

$3^{rd}$ Generation Partnership Project 2 "3GPP2", "Interoperability Specification (IOS) for Broadcast Multicast Services (BCMCS)", 3GPP2 Publication Version, A.S0019-A, version 1, Oct. 2006 (122 pages).

3rd Generation Partnership Project 2 "3GPP2", "Interoperability Specification (IOS) for Broadcast Multicast Services (BCMCS)", 3GPP2 Publication Version, A.S0019-A, version 2, Apr. 2008 (120 pages).

3rd Generation Partnership Project 2 "3GPP2", "Interoperability Specification (IOS) for Broadcast Multicast Services (BCMCS)", 3GPP2 Publication Version, A.S0019-0, version 1, Nov. 2004 (110 pages).

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

U.S. Appl. No. 60/671,099, filed Apr. 14, 2005.

* cited by examiner

BROADCASTING IN WIRELESS SYSTEMS

TECHNICAL FIELD

This description relates to broadcasting in wireless systems.

BACKGROUND

Broadcasting information to more than one user in a wireless system can reduce the demands on the communication capacity of a wireless network by allowing more than one user to receive the information without requiring more than one point-to-point transmission. The benefits of broadcasting information are especially important for multimedia content, such as financial news-clips or graphics needed by business users, or sports-clips, weather forecasts, music, videos, and movies that are targeted to consumers.

Wireless access technologies such as High Data Rate (HDR) enable high-speed wireless data services (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1×EV-DO," Aug. 21, 2000). The Telecommunications Industry Association (TIA) has adopted HDR as a standard in the CDMA2000 family of wireless technology standards. The service is formally referred to as HRPD (High Rate Packet Data) and is also known as IS-856. Because TIA adopted HRPD as an EVolution of the current 1×RTT standard for high-speed data-only (DO) communication, the standard is also known as 1×EV-DO. An example of a 1×EV-DO network is Airvana's All-IP 1×EV-DO Wireless Data Network.

1×EV-DO systems are typically implemented using a radio access network (RAN) 20 as shown in FIG. 1. The RAN 20 converts content to a format that is amenable to transmission over an airlink 12 to access terminals 10. The access terminals 10 may be laptop computers, personal digital assistants (PDAs), dual-mode voice/data handsets, or other devices with built-in 1×EV-DO support.

The 3rd Generation Partnership Project 2 (3GPP2) is developing a standards family describing a broadcast service called Broadcast and Multicast Service (BCMCS) in cdma2000 Wireless IP networks (see 3GPP2, "CDMA2000 High Rate Broadcast-Multicast Packet Data Air Interface Specification", C.S0054 (February 2004) and 3GPP2, "BCMCS in cdma2000 Wireless IP Network", X.S0022 (December 2004)), both incorporated here by reference (collectively "the Standard"). BCMCS enables operators to deliver broadcast media (including multimedia applications) less expensively than having individual users obtain the same streams through point-to-point connections.

Referring to FIG. 1, the Standard describes the airlink interface as well as higher-layer protocols between an access terminal (AT) 10 and the radio access network (RAN) 20. The Standard defines a network reference model describing the logical elements that make up BCMCS. FIG. 2 shows a simplified version of this reference model.

SUMMARY

In one aspect, the invention features a method for multicasting information from a radio network controller to radio nodes. Implementations of the invention include one or more of the following. The multicasting includes IP multicast. The method further includes broadcasting the information from the radio nodes to mobile access terminals. The information includes content to be delivered to the access terminals. The method further includes enabling an operator to configure the broadcasting of the information. The operator is enabled to configure at least one of a set comprising the content's time of flow, place, flow parameters and quality of service.

In another aspect, the invention features a method for broadcasting information in a wireless network using broadcast serving node functions distributed between a radio network controller and a broadcast-multicast service controller, and without requiring a broadcast-capable packet data serving node.

Implementations of the invention include one or more of the following. The broadcast serving node functions include at least one of a set comprising content preparation, attaching Point-to-Point Protocol headers, attaching Frame Check sequence (FCS) trailers, implementing Broadcast Framing Protocol, implementing Broadcast Security Protocol, implementing Broadcast MAC Protocol, addition of Reed-Solomon Error detection coding to the content stream, and the management of broadcast logical channels. The broadcast-multicast service controller implements at least one of the set comprising logical channel management, broadcast framing, MAC protocols, security protocols and time-of-transmission calculation.

In another aspect, the invention features a method for enabling a mobile access terminal in a wireless network to soft-combine broadcast signals across radio network controllers footprints as the terminal moves across sectors that are served by radio nodes homed to different ones of the radio network controllers. Each of the radio network controllers can implement at least one of the set including logical channel management, broadcast framing, MAC protocols, security protocols and time-of-transmission calculation.

In another aspect, the invention features a method for enabling a broadcast logical channel manager in a wireless network to track assignments of content flows to logical channels and assignments of logical channels to physical channels. The broadcast logical channel manager can use statistics about slot usage on individual sectors to create broadcast channels and to allocate flows to them in a substantially optimal manner.

In another aspect, the invention features a method for operating a signaling protocol between a radio network controller and radio nodes in a wireless network, where the signaling protocol includes a combination of IP Multicast and IP Unicast.

Implementations of the invention include one or more of the following. The radio network controller signals the radio nodes to enable the management of broadcast logical channels. The signal that is sent to the radio nodes is one of a set including creating, modifying, or deleting broadcast logical channels. Neighboring sector information is used to make a determination about which programs are available to the access terminals for each radio node. The radio network controller creates broadcast overhead messages using the neighboring sector information and sends the broadcast overhead messages to the radio nodes.

In another aspect, the invention features a method for implementing broadcast and multicast service in a 1×EV-DO network where resource information and broadcast functionality is distributed in a redundant manner among multiple radio network service module processors.

In another aspect, the invention features a system including radio nodes, and a radio network controller to multicast information to the radio nodes, the radio network controller being interconnected with the radio nodes using a network.

Implementations of the invention include one or more of the following. The system network includes an Internet Protocol (IP) network. The radio node controller uses IP multicast to send information to the radio nodes. The system further includes a broadcast-multicast service controller in communication with the radio network controller, the controllers to perform broadcast serving node functions. The broadcast serving node functions include one or more of the following: content preparation, attaching Point-to-Point Protocol headers, attaching Frame Check sequence (FCS) trailers, implementing Broadcast Framing Protocol, implementing Broadcast Security Protocol, implementing Broadcast MAC Protocol, addition of Reed-Solomon Error detection coding to the content stream, and the management of broadcast logical channels.

In other aspects, corresponding computer programs and apparatus are also provided. Among the advantages of the invention are one or more of the following. Network load can be reduced and scalability with respect to the number of radio nodes is ensured. Broadcast services can be provided without having to modify existing unicast-oriented packet data serving nodes. Access terminals can receive and soft-combine signals from radio nodes that belong to two or more different radio network controller groups, thus increasing reception quality as users roam across the radio network controller (RNC) footprints. Bandwidth use and flow allocation is optimized for content delivery. Fault-tolerance is supported by allowing broadcast responsibilities to be quickly reassigned in the event of a failure. Network operators, with control over a content server, may configure broadcast content, i.e., time of flow, place, flow parameters like bandwidth, QoS, etc. tailoring content delivery to their own requirements instead of having these decisions made by upstream content providers. The system can receive content simultaneously from multiple content servers, each of which could be using a different transport mechanism. One implementation includes all of the foregoing advantages. Other features and advantages of the invention will be apparent from the description and from the claims.

DESCRIPTION

Figure 1:
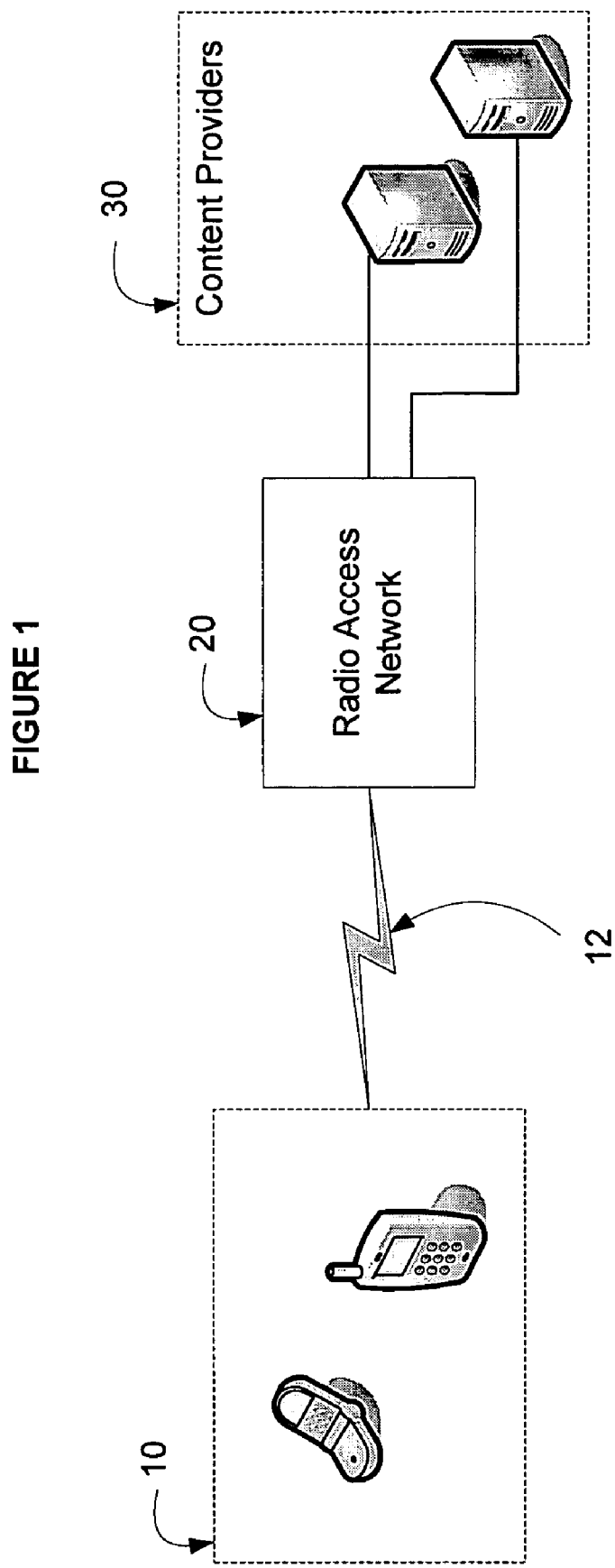
FIG. 1 is a block diagram of a wireless broadcast system.
Figure 2:
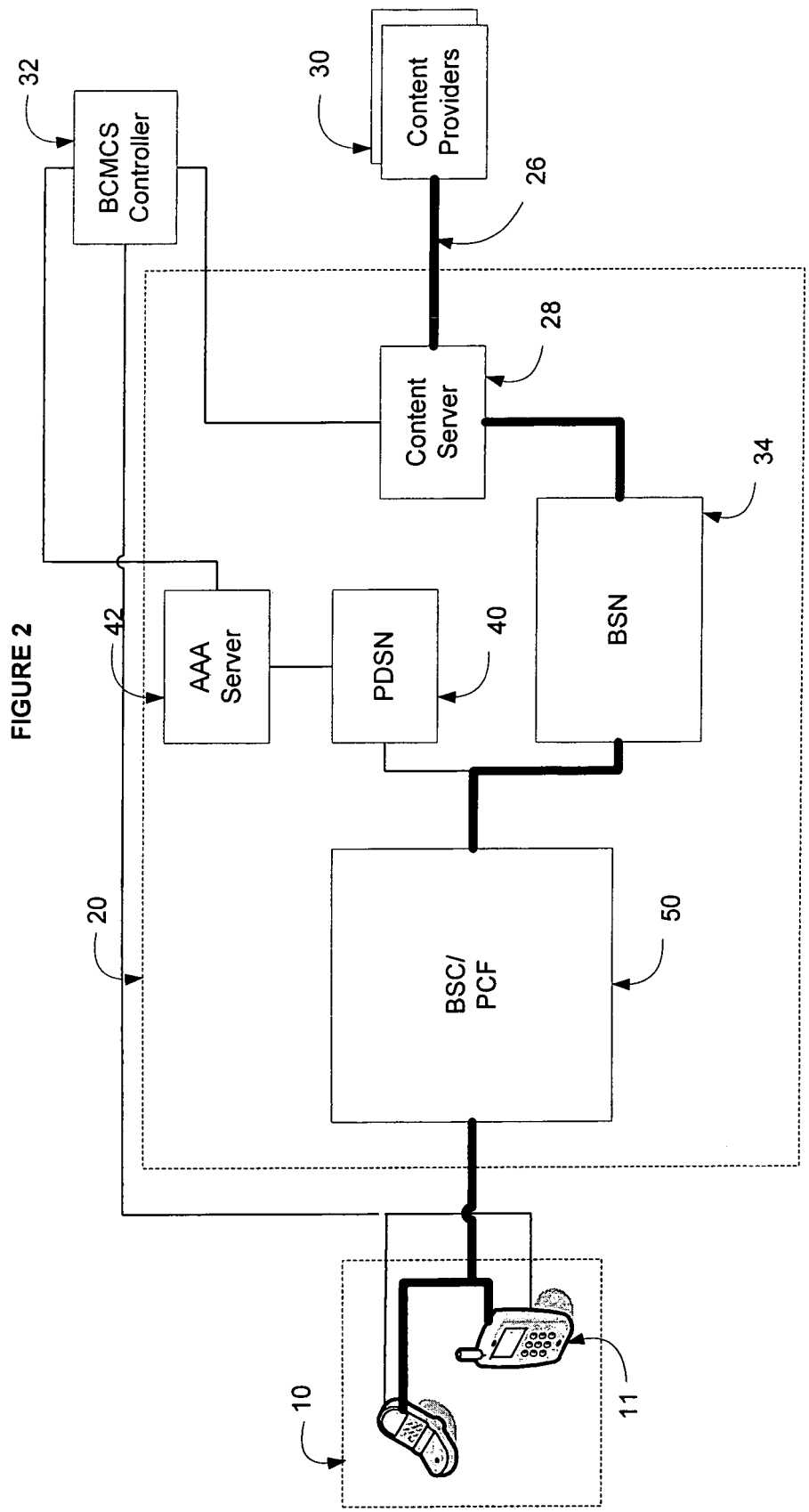
FIG. 2 is a block diagram of a radio access network.

FIG. 2 shows an example network 20 in which BCMCS services may be offered. Content providers 30 are the sources of streams of data representing multimedia content that are eventually transmitted over the air to the ATs 10. These providers 30 direct the streams of content 26 (e.g., various video and audio streams) to a content server (CS) 28. Each stream of content is also called a flow, and in some examples, each flow may be referred to using a flow ID.

The content server 28 receives programs of content from the content providers 30 and informs the BCMCS Controller 32 of the programs' requirements. These requirements may include, for example, the start and end times, bandwidth, addressing information, quality of service (QoS), and other parameters that may be useful to the RAN 20 in delivering the programs to the ATs 10. The CS 28 communicates with a BCMCS controller to inform the controller of these requirements.

The BCMCS controller 32 has an interface with the RAN 20 that enables the BCMCS controller to be kept informed about current and future committed usage of airlink resources. The BCMCS controller 32 uses the information about usage to inform the CS 28 about decisions by the BCMCS controller 32 to accept or reject programs.

Alternatively, the BCMCS controller 32 may communicate with the RAN 20 or a broadcast serving node (BSN) 34 about the program requirements and receive acceptance/rejection from the RAN 20/BSN 34. The BCMCS controller 32 may decide to accept (carry) or reject programs based on conditions such as subscriber interest and airlink resource availability. The BCMCS controller 32 provides BCMCS session information (such as encryption keys, header compression details, and mappings of IP multicast addresses to flow IDs) to, the ATs 10. The BCMCS controller 32 has a publicly visible IP address.

The BSN 34 is a logical entity that, in accordance with the Standard, performs content preparation (attaching Point-to-Point Protocol (PPP) headers and Frame Check Sequence (FCS) trailers), implementation of a Broadcast Framing Protocol, a Broadcast Security Protocol and a Broadcast MAC (medium access control) Protocol, addition of Reed-Solomon Error-detection coding to the content stream, and the management of broadcast logical channels. Although the Standard specifies certain logical characteristics of the BSN, the Standard does not specify how the logical BSN should be implemented physically or on which physical network element(s).

The network typically includes a packet data serving node (PDSN) 40 that can be viewed as an edge router that supports mobility. The Standard contemplates using a PDSN that is capable of broadcasting and/or multicasting information, though existing non-BCMCS-enabled 1×EV-DO implementations typically use PDSNs that are only unicast-capable. The PDSN 40 maintains link layer connectivity and is a first-hop router as far as the ATs are concerned. The PDSN 40 has both internal (private IP) and external (public IP) interfaces. The internal interfaces point to the BSN 34. The PDSN 40 also interfaces to AAA servers 42 that provide authentication, authorization, and accounting (AAA) services.

BCMCS users can be selectively enabled to tune into the broadcast streams. This selectivity can be achieved at the content level by encrypting content at the content provider 30 and exchanging keys with the AT 11. The Standard allows users to dynamically register for broadcast streams (in other words, specify which broadcast streams the user wishes to monitor, thereby expecting them to be delivered on the network). In this dynamic scenario, users can be authenticated when they request that a broadcast stream be made available. In addition, accounting records that track usage on a per-user basis may be generated.

A Base-Station-Controller/Packet-Control-Function (BSC/PCF) 50 performs signaling, set up and tear down of bearer paths (for data) between the PDSN 40 and the ATs 10, and possibly short-term key link layer encryption. The BSC/PCF 50 also picks the best bearer path to the ATs 10. 'Best' may be defined as the outcome of an optimization process that takes into consideration, for example, resources in the network, airlink resources, and QoS parameters.

Figure 3:
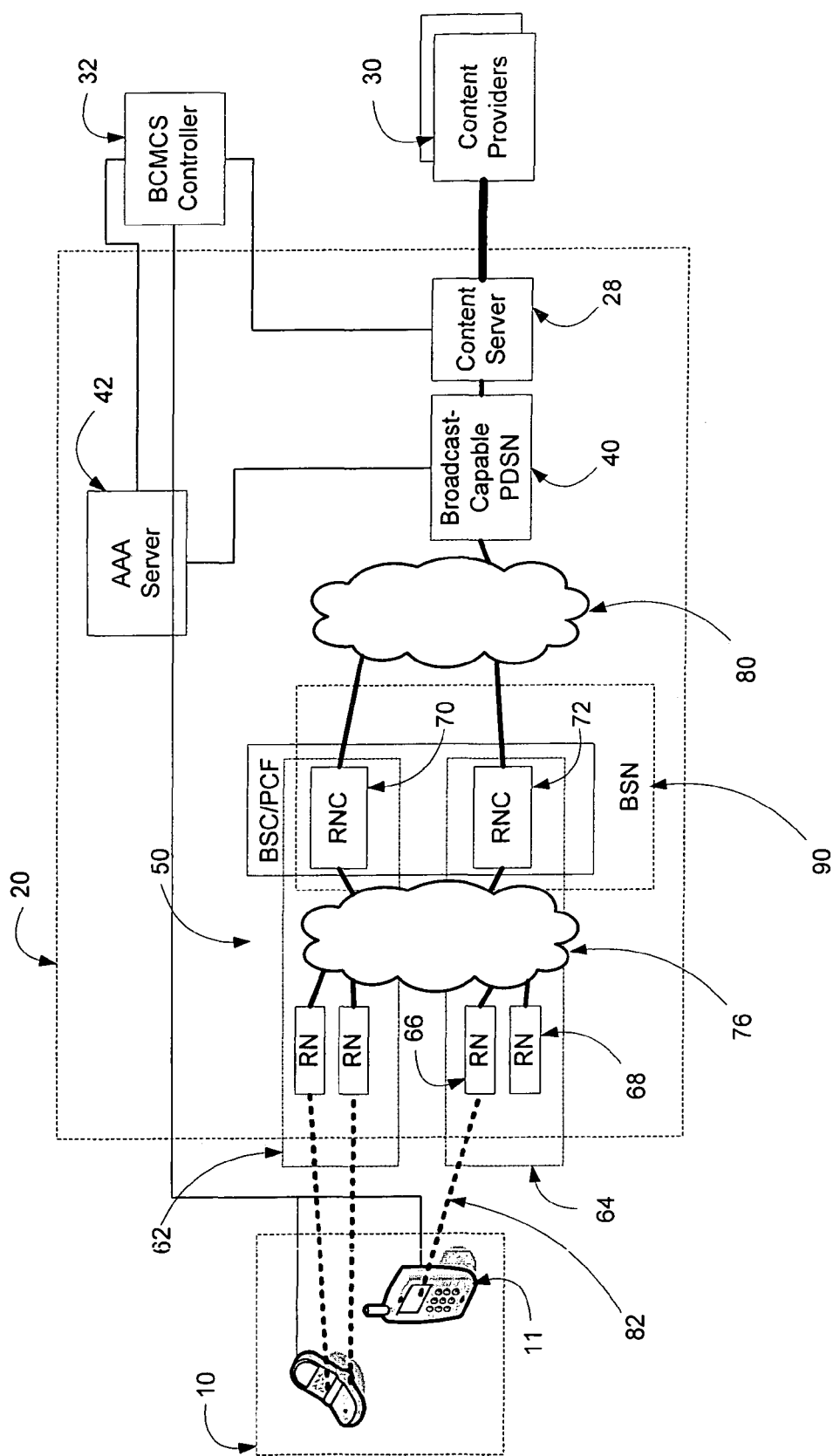
FIG. 3 is a block diagram of an implementation of a radio access network.

FIG. 3 shows a RAN 20 for a 1×EV-DO system and on which BCMCS may be implemented. The RAN 20 may be divided into one or more subnetworks (or subnets) 62, 64. Each subnet includes a set of radio nodes (RNs) 66, 68 and one or more radio network controllers (RNCs) 70, 72. The RNs 66, 68 are connected to the RNCs 70, 72 over an RNC-RN backhaul network 76. In a new generation of IP-based radio access networks, such as Airvana's All-IP 1×EV-DO Wireless Data Network, the backhaul network can be implemented using a shared IP or metropolitan Ethernet network which supports many-to-many connectivity between RNs and RNCs. Additional information about Airvana's All-IP 1×EV-DO Wireless Data Network may be found in "All-IP 1×EV-DO Wireless Data Networks—A Technical White Paper", available at http://www.airvananet.com/1xev/white-papers_register.cfm, and is incorporated here by reference. In some examples of the system, the BSC/PCF 50 functionality may be implemented in part by the RNCs 70, 72. In some examples, RNC 72 is connected over a network 80 to one or more PDSNs 40. The RNC 72 and PDSN 40 may also be connected over the same backhaul network 76 used to connect the RNCs 70, 72 and RNs 66, 68.

Figure 4:
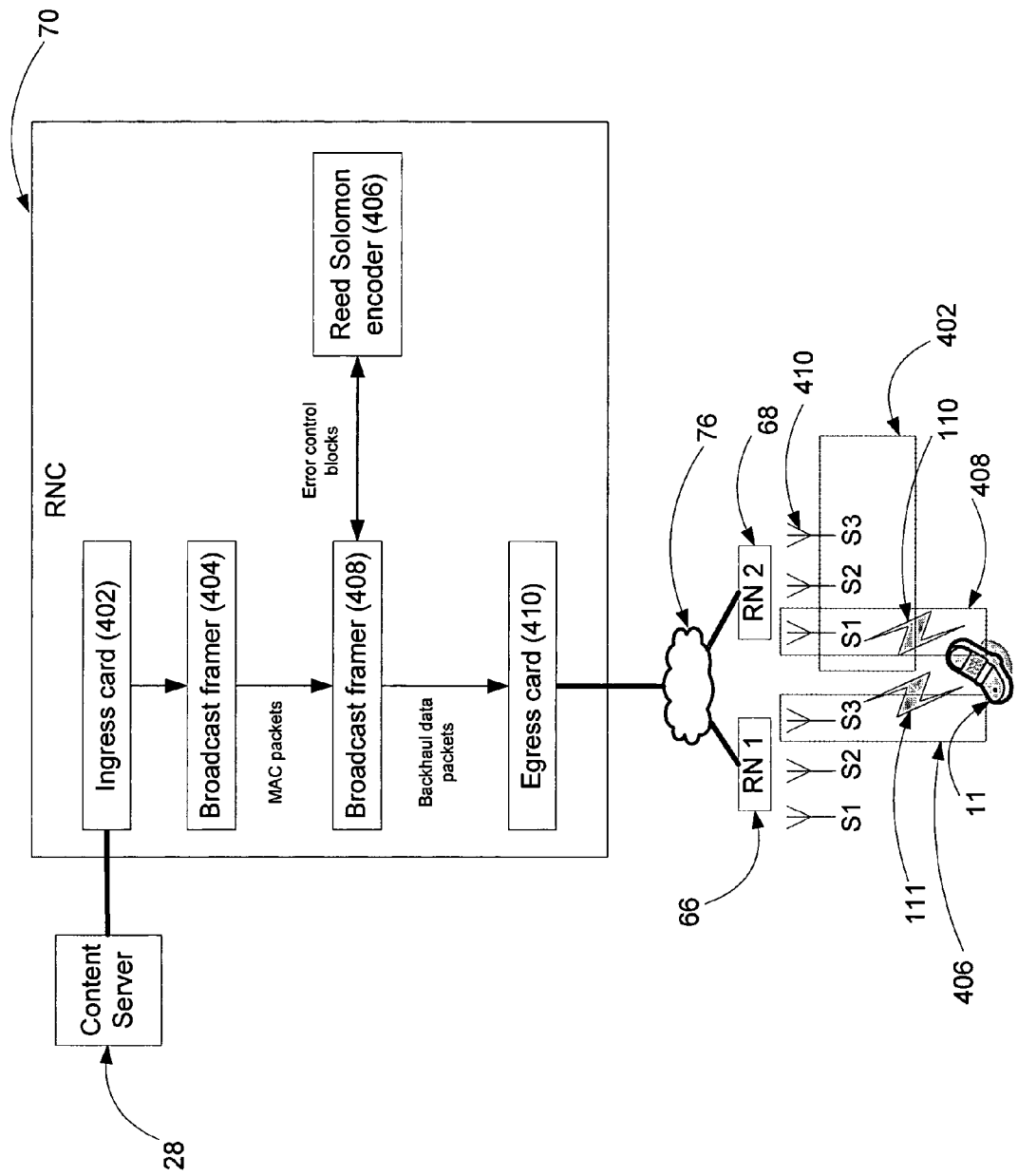
FIG. 4 is a block diagram of an implementation of a radio access network.

As shown in FIG. 4, an ingress card 402 of the RNC 70 receives packets from the CS 28, and passes the packets to a first broadcast framer 404 that chunks them into broadcast MAC packets using a broadcast framing protocol. A second broadcast framer 408 receives the data part of an Error Control Block (ECB) from a Reed Solomon encoder 406, associates a transmit timestamp with each MAC packet based on the knowledge of the current time and a broadcast channel associated with the corresponding flow, packs the ECB into an RNC-RN Broadcast Data Frame and sends the data frame as a backhaul data packet to all the RNs 66, 68 via an egress card 410 of the RNC 70. After the RNs 66, 68 receive the packets, they transmit them over the air using one or more broadcast channels 111, 110 to the AT 11.

Referring again to FIG. 4, each RNC 70 typically controls 25-100 RNs 66, 68. Each RN 66, 68 typically supports 1-4 carriers each of 1.25 MHz of bandwidth. Each cell area (e.g. 402) is typically divided into multiple sectors (e.g. 408) (typically 3 or 6) and the RN 66, 68 has one radio transceiver 410 for each sector 408.

The RAN 20 transmits a broadcast overhead message over the air at appropriate intervals. The broadcast overhead message may contain information about airlink resource use, available programs, sectors that are transmitting the same program, and other information that the AT 11 needs to properly decode the programs and to perform soft-combination (described later).

Figure 5:
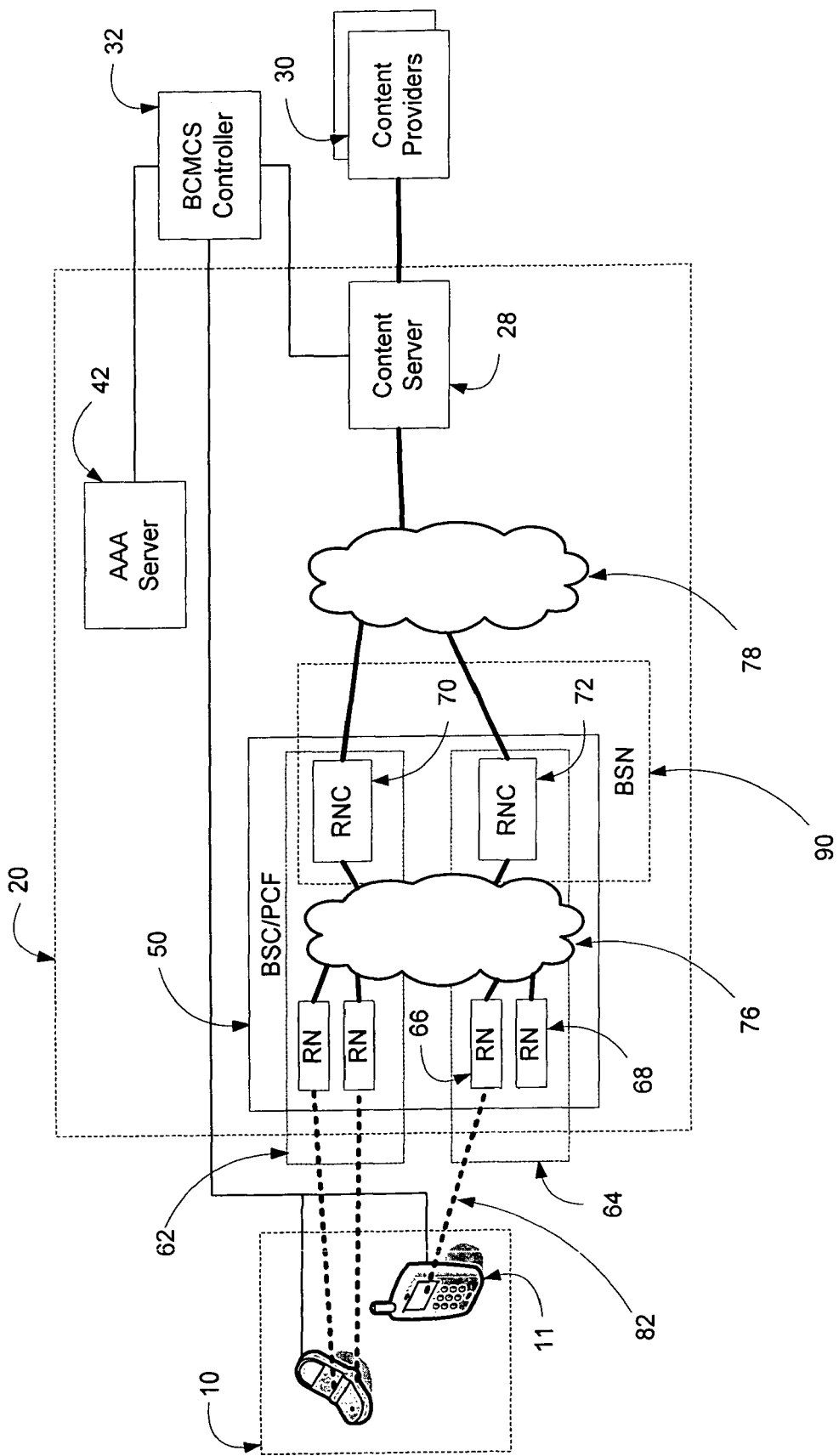
FIG. 5 is a block diagram of an implementation of a radio access network.

In one example of the system shown in FIG. 5, the RNCs 70, 72 themselves can provide the complete BSN functionality and directly interface with the CS 28 through a CS-RNC network 78 instead of interfacing with and requiring a broadcast-capable PDSN.

Still referring to FIG. 5, an AT 11 can receive a flow (which is referenced by flow ID) from the CS 28 using a flow-ID-to-multicast-address/port mapping. The AT's 11 radio node (i.e. 66) receives the flow from the RNC 72 on the corresponding address/port and transmits it to the AT 11 over a broadcast channel 82. The mapping is obtained either statically or from the BCMCS controller 32. BCMCS may be implemented by the RAN 20 in two ways—static and dynamic. In static BCMCS, the ATs 10 cannot initiate setup/teardown of broadcast flows by telling an RNC 72 what content the ATs 10 wish to receive, while in dynamic BCMCS, the ATs 10 can.

For static BCMCS service, the RNC 72 allows the operator to configure each of the broadcast flows to be relayed over the broadcast channel (i.e., 82). This involves configuring, for example, the stream rate, the desired QoS parameters, the desired Reed-Solomon encoding; start and stop times; and periodicity (every hour for 5 minutes, for example) for the flow. This might involve the configuration of the set of RNs 66, 68 that are intended to carry the broadcast flows.

The CS 28 sends information about the flows to the BCMCS controller 32. As shown in FIG. 5, after possibly reformatting their content, the CS 28 sends the flows to multiple RNCs 70, 72 as multiple flows, each having its own flow ID and IP multicast address. Alternatively, as shown in FIG. 3, the CS 28 can send the data to a broadcast-capable PDSN 40, which then sends it to the RNCs 70, 72. In some implementations, the content is contained in IP Multicast packets. The CS 28 may also encrypt the content (if the operator has configured such encryption). The content may be encapsulated in an outer IP Multicast packet (whose scope is limited to the CS-RNC network) or sent through unicast generic route encapsulation (GRE) tunnels that terminate in the RNCs 70, 72. The RNC 70, 72 accepts any transport protocol used by the CS 28.

After receiving a content flow, the RNC 72 frames it using a broadcast framing protocol and sends the resulting flow to its homed RNs 66, 68 over the IP backhaul network 76. The RNs 66, 68 then schedule the packets for over-the-air (OTA) transmission using a broadcast channel (i.e., 82).

In some implementations, the CS 28 may be situated outside the RAN 20, in which case the RNCs 70, 72 may have to be publicly-addressable from an IP perspective.

Use Of Ip Multicast

Referring to FIG. 5, in some examples, IP Multicast is used in either or both of the CS-to-RNC connections 78 and the RNC-to-RN connections 76.

If the CS 28 is communicating with multiple RNCs 70, 72, then the CS 28 can supply content to the RNCs 70, 72 in multicast IP packets. Flow IDs can be mapped to a <multicast address, port>tuple. The RNCs 70, 72 can sign up for the appropriate groups at the Start Time specified in the AddFlow Message Type. The advantages of multicast in this part of the system are limited and depend on the number of RNCs 70, 72 being served by the CS 28. For efficiency, the CS 28 may need to define (and measure data against) a unicast-multicast switchover threshold prior to sending the content via multicast or broadcast.

Having the RNC 70 supply the MAC packets to the RNs 66, 68 using IP Multicast can be beneficial because there may be up to 400 RNs homed into a single RNC. Depending on the network topology, multiple sets of multicast addresses may be needed (one or more for the CS->RNC communication and one or more for the RNC->RNs communication).

Some embodiments of the system have aspects that may help facilitate the use of multicast techniques. First, the BSC 50 may be configured with only private IP addresses. This alleviates access management issues of inter-domain routing caused by unwanted receivers or senders joining into the multicast sessions. If the CS 28 is outside the RAN 20, then an additional proxy CS (not shown) inside the RAN 20 which will talk to the RNCs 70, 72 may be needed.

Second, router configuration may be used to protect the security/integrity of the routing control traffic using IPSec or non-cryptographic authentication mechanisms such as using configuration to filter the list of neighbors from which network elements within the RAN 20 can accept routing messages. If, however, the multicast control traffic is limited to the private network, then there is little scope for security issues.

Third, the CS 28 may be used to manage the allocation of multicast (address, port) tuples to a flow ID so that address collisions are avoided. Because the CS 28 is aware of all flows in the network, it can communicate this information to the RNCs 70, 72 using CS-RNC control protocol messages.

Fourth, by using IP Multicast, system operators have access to effective tools to monitor/debug multicast traffic. Currently, there are free tools that can be used for this purpose. Also, router vendors have implemented support for protocols such as Multicast Reachability Monitor, which can be used for monitoring multicast traffic.

To facilitate the use of multicast, the RNs 66, 68 and RNCs 70, 72 implement support for the Internet Group Management Protocol router protocol version 2 (IGMPv2) as well as for some configuration to indicate the address of the Rendezvous Point (RP) for the Protocol-Independent Multicast (PIM) routing domain. IGMP is used to manage membership in multicast groups, and defining an RP enables the protocol to discover multicast sources from other domains. The RN 66, 68 and RNC 70, 72 would not have to participate in the actual multicast routing but merely act as a host using IGMP to communicate with the routers. IGMP v2 could be used, while implementing IGMP v3 is preferable since it will allow support for future enhancements. If daisy-chaining of RNs is needed, then provisions for a "static multicast route" to enable the multicast datagrams to be forwarded by one RN to another will have to be made.

Bsn Implementation

In some implementations, such as that shown in FIG. 5, the BSN 90 functions are part of the RNC 70, 72. In those cases, the RNC is capable of content preparation, attaching Point-to-Point Protocol headers, attaching Frame Check sequence (FCS) trailers, implementing Broadcast Framing Protocol, implementing Broadcast Security Protocol, implementing Broadcast MAC Protocol, addition of Reed-Solomon Error detection coding to the content stream, and/or the management of broadcast logical channels. In these examples, the PDSN 40 does not need to be broadcast-capable, and no BCMCS-specific interface is needed between the PDSN 40 and the RAN 20 and between the PDSN 40 and the BCMCS controller 32. Although the Standard separates the BSN from the BCMCS controller 32, a similar reduction in interfaces may be achieved by implementing the BCMCS controller and BSN functions together.

Various framing procedures and calculation of the time-of-transmission may also be implemented on the BCMCS controller 32. If time-of-transmission is implemented on the BCMCS controller 32, then the ATs 11 may perform soft-combination of signals across RNC 70, 72 footprints (described later).

Rn Subset Management

In order to support 1) dynamic BCMCS (where the set of flows available at each sector may be different because of AT behavior), 2) turning flows on and off for RAN backhaul and/or airlink efficiency considerations, and 3) heterogeneous RNs in the RAN, the subset of RNs that are the intended destinations for each logical channel on the RNC are tracked and managed.

The subset of RNs that are required to support a particular broadcast flow may differ from the subset of RNs that are required to support another broadcast flow. For instance, referring now to the example in FIG. 6, the AT 611 receiving flow 2 requires RN1 66 to receive that flow, but RN2 68 would not need to subscribe to it. Clear identification of the relevant subset of RNs 66, 68 for each broadcast flow is required at the RNC 70, 72 so as to increase signaling and data traffic forwarding efficiencies. Due to AT 11 flow selection behavior, the relevant subset of RNs for a particular broadcast flow may change dynamically while that flow is active.

Some RAN implementations may manage RN subsets instead of sector subsets even though all broadcast flows are a property specific to each sector. An architecture that manages RN subsets is based on a principle of replicating broadcast flow data at the last possible juncture. In this architecture, a single packet sent by the RNC to a RN can be replicated and sent out on as many of the sectors on that RN as needed, and the ASIC driver (e.g., a Cell Site Modem™ (CSM™) CSM6800™ driver available from Qualcomm Incorporated) handles this functionality if configured properly with a bit map specifying the sectors to transmit on. Further, the signaling exchange is defined to be between the RNC and a peer on the RN responsible for all sectors on that RN. This ensures that both data and signaling scale with the number of RNs in the network and not with the number of sectors in the network and reduces the work required to support the BCMCS by up to a factor of three. The amount of data transmitted from the RNC without backhaul multicast support is $O(f*n)$, where f is number of flows active and n is the number of RNs that are intended destinations. The amount of data transmitted from the RNC with backhaul multicast support is $O(f)$. The signaling messages transmitted by the RNC for all flow setups/teardowns without backhaul multicast support will be $O(f*n)$. The signaling messages transmitted by the RNC for all flow setups/teardowns with backhaul multicast support will be $O(f)$.

Figure 6:
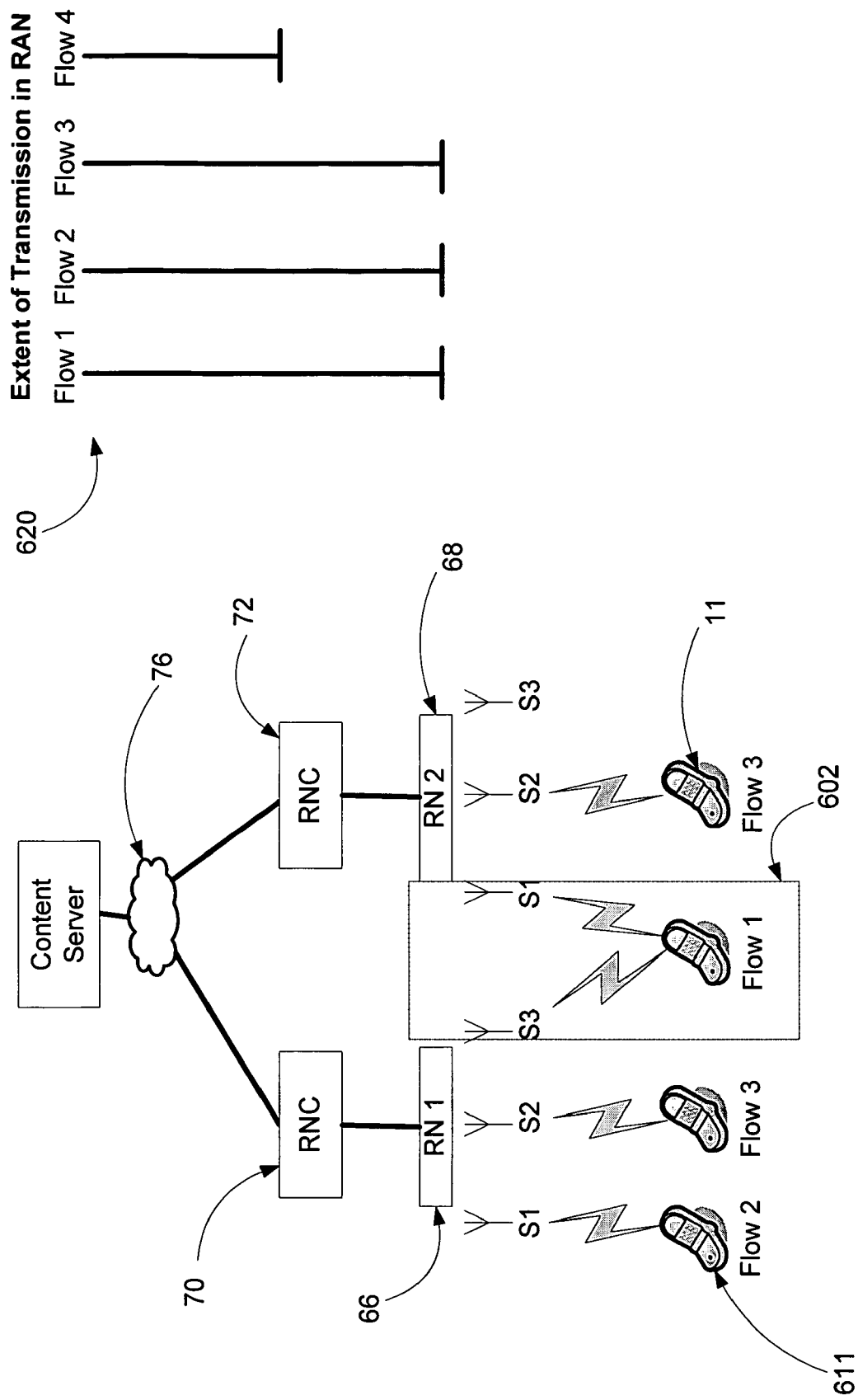
FIG. 6 is a block diagram of information flow through a radio access network.
Figure 7:
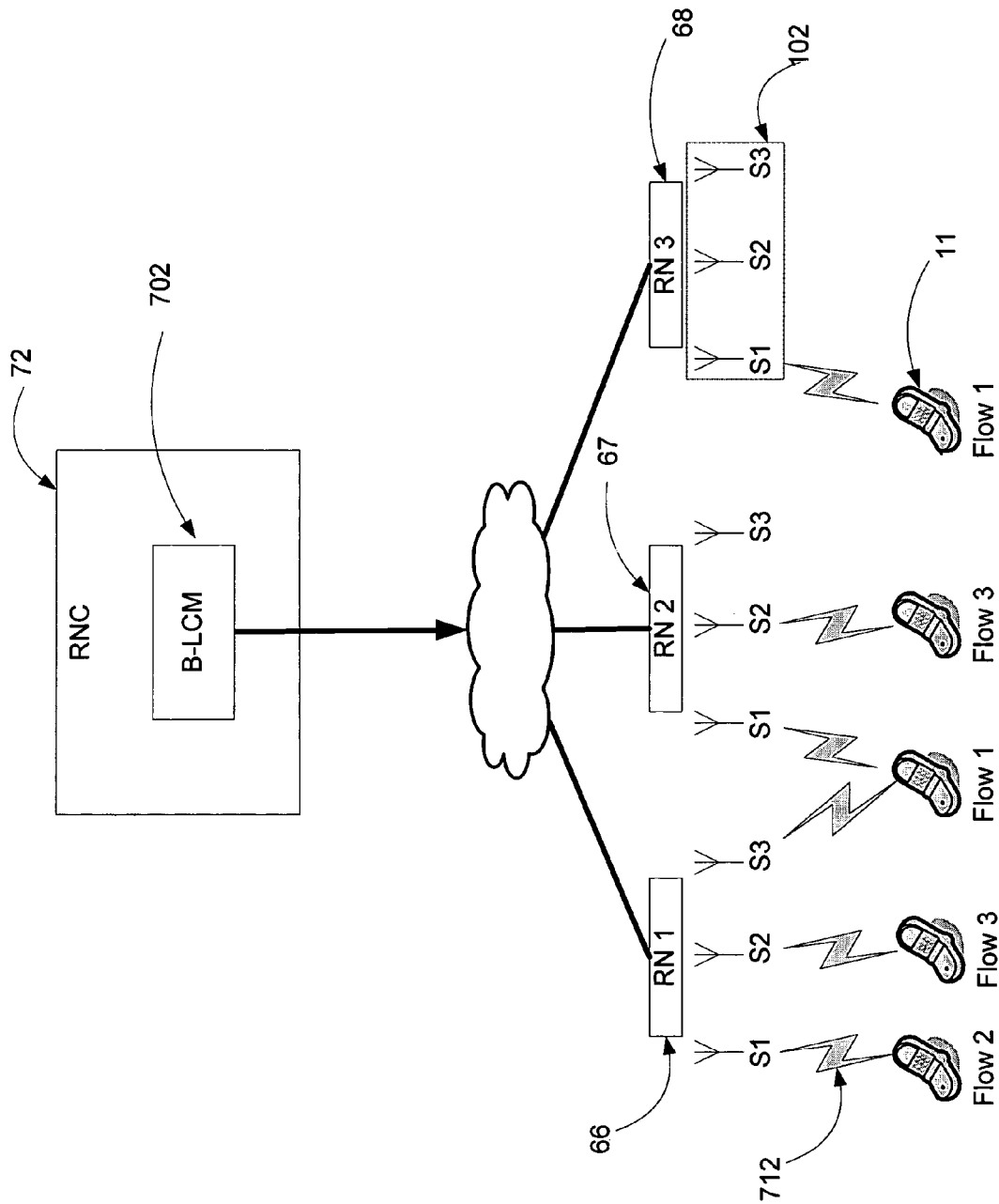
FIG. 7 is a block diagram of information flow through a radio access network.

There are several grades of RN subset management that may be used within the system. FIG. 7 shows a simple scenario where several ATs 11 are receiving various channels. The simplest grade of management is that needed for handling heterogeneous RNs in the RAN. It is conceivable that the subset of RNs for every broadcast flow can be made the same, namely, the subset of those RNs that can support the BCMCS and on which the BCMCS feature has been enabled. The subset may change dynamically as RNs home/dehome or as the BCMCS feature is enabled/disabled. The subset assignment relative to FIG. 6 for this grade would be:

| Low Grade Management - Flow Assignment | | |
| --- | --- | --- |
| Flow | RNs | Sectors |
| 1 | All | All |
| 2 | All | All |
| 3 | All | All |

The middle grade of management is that needed for improving RAN backhaul and airlink efficiency. In this case (assuming heterogeneous RNs), the subset of RNs for every broadcast flow may be different. In this grade, the subset of RNs for a particular broadcast flow contains those RNs that (1) can support the BCMCS, (2) on which the BCMCS feature has been enabled, and (3) one of whose sectors has an AT actively monitoring the broadcast flow. In this case, the needs of ATs in neighboring sectors (to soft combine from this sector) can be ignored. The subset-assignment relative to FIG. 7 for this grade would be:

Medium Grade Management - Flow Assignment

| Flow | RNs | Sectors |
|------|-----|---------|
| 1 | All | All |
| 2 | 1 | All |
| 3 | 1, 2 | All |

A high grade of management is that needed for supporting the dynamic BCMCS. This case builds on the previous case by considering (in addition to the factors in the previous case) the setup and teardown of AT-initiated broadcast flows as triggers for managing the RN subset. In addition, in this case, the system takes into account whether ATs in other sectors are relying on soft-combining from this sector and acts accordingly. Note that the channel assignment for the lowest grade management would require 3 channels*2 RNs*3 sectors/RN=18 OTA flows. This high-grade subset assignment would be:

High-Grade Management - Flow Assignment

| Flow | RNs | Sectors |
|------|-----|---------|
| 1 | 1 | 3 |
| 1 | 2 | 1 |
| 1 | 3 | 1 |
| 2 | 1 | 1 |
| 3 | 2 | 2 |
| 3 | 3 | 2 |

Ran Backhaul And Airlink Efficiency Considerations

If BCMCS flow registration message handling is supported, the RNC can determine on a per-flow basis how many ATs are actively monitoring the flow in the network per sector. This information can be used to preserve airlink bandwidth and backhaul efficiency and to collect use statistics.

Airlink bandwidth can be conserved by closing the broadcast flow on a sector if there are no ATs listening to a specific BCMCS flow on that sector. The content would still be received at the RNC, and in some examples of the system, would be forwarded to the specific RNs. However, turning off broadcast flows on a sector-by-sector basis has its disadvantages; it would affect the coverage of that flow on its neighboring sectors as the ATs in the neighboring sectors would not be able to make use of soft-combination with the data transmitted by this sector.

The system takes action to stop transmitting the broadcast flow so that the airlink resources are freed for other traffic and also to resume the broadcast flow transmission when needed. Referring to FIG. 6, when the RNC 72 decides that a particular RN 68 does not need to transmit a particular broadcast flow (flow 2, in this example) on a particular sector, the RNC 72 signals the RN 68 that it is to update the broadcast overhead message on that sector, and possibly release driver resources. In addition, the RNC 72 may inform RNs associated with neighboring sectors (i.e., RN-1 66) to update their broadcast overhead messages appropriately to remove the sector in question from the list of soft-combinable sectors for that particular broadcast flow. Both actions are mandatory to achieve airlink efficiency without degrading performance. If the neighboring sectors continue to send their old broadcast overhead messages (indicating that the AT can soft-combine signals from the sector where transmission is being stopped), performance will suffer for all ATs that mistakenly soft-combine packets that should not be soft-combined—in fact, the ATs will drop these packets completely. When resuming a broadcast flow on a particular sector, the RNC initiates a similar set of actions.

Not forwarding unnecessary broadcast traffic in the backhaul can improve backhaul efficiency as well. By itself, this approach has considerable merit especially if the RNC is generating copies (one per RN) for the broadcast flow. FIG. 6 illustrates a scenario in which no ATs require flow 4, and in which three other flows are being received by other ATs (i.e. 611). In the scenario depicted in FIG. 6, one possible transmission map 620 is shown which takes into account the above considerations. In the figure, the first three flows are transmitted to the RNs 66, 72 to enable soft-combining as ATs move within the cell areas (i.e., 602) while the fourth flow is not transmitted in the backhaul.

Logical Channel And Rate Mapping

In order for the RAN to broadcast content to the ATs, the content is assigned to the broadcast channels that the ATs receive. Referring now to FIG. 7, in some implementations, a broadcast-logical channel manager (B-LCM) 702 maps broadcast streams to one or more logical broadcast channels, and assigns a data rate to each of the logical channels by assigning each channel to a physical slot. Airlink resources are divided into a number of slots, which are further divided into interlaces and multiplexes. The logical channels are representations of mappings from one or more content flows to the broadcast channels which the ATs ultimately receive.

The B-LCM 702 tracks logical channel assignments in each sector. In some implementations, the B-LCM 702 is implemented in the RNC 72, and uses a signaling protocol between the RNC 72 and the RNs 66-68 that directs the RNs to create, modify and delete broadcast channels. The RN 66-68 then performs the requested actions on its forward link modem card.

The signaling protocol allows the RNC 72 to use information about multiple sectors to create the broadcast overhead messages, which then get advertised on the airlink 712 to enable ATs (i.e., 11) to determine how to access specific programs. RNC 72 can use the neighboring sector information to create the broadcast overhead message uniquely for each RN 66-68. The protocol may use a combination of IP Multicast and IP Unicast for the transport layer thereby reducing bandwidth consumption for messages that are common to multiple RNs while allowing the use of Unicast for messages that are targeted for individual RNs. The broadcast overhead message is an example of using multicast for two RNs 67, 68 which are to receive the same overhead message and unicast for RN 66.

Referring now to FIG. 5, the BCMCS controller 32 may also perform the logical channel management functions, in which case the CS 28 interface also includes provisions for content signaling and data.

Flow To Logical Channel Mapping

Figure 8:
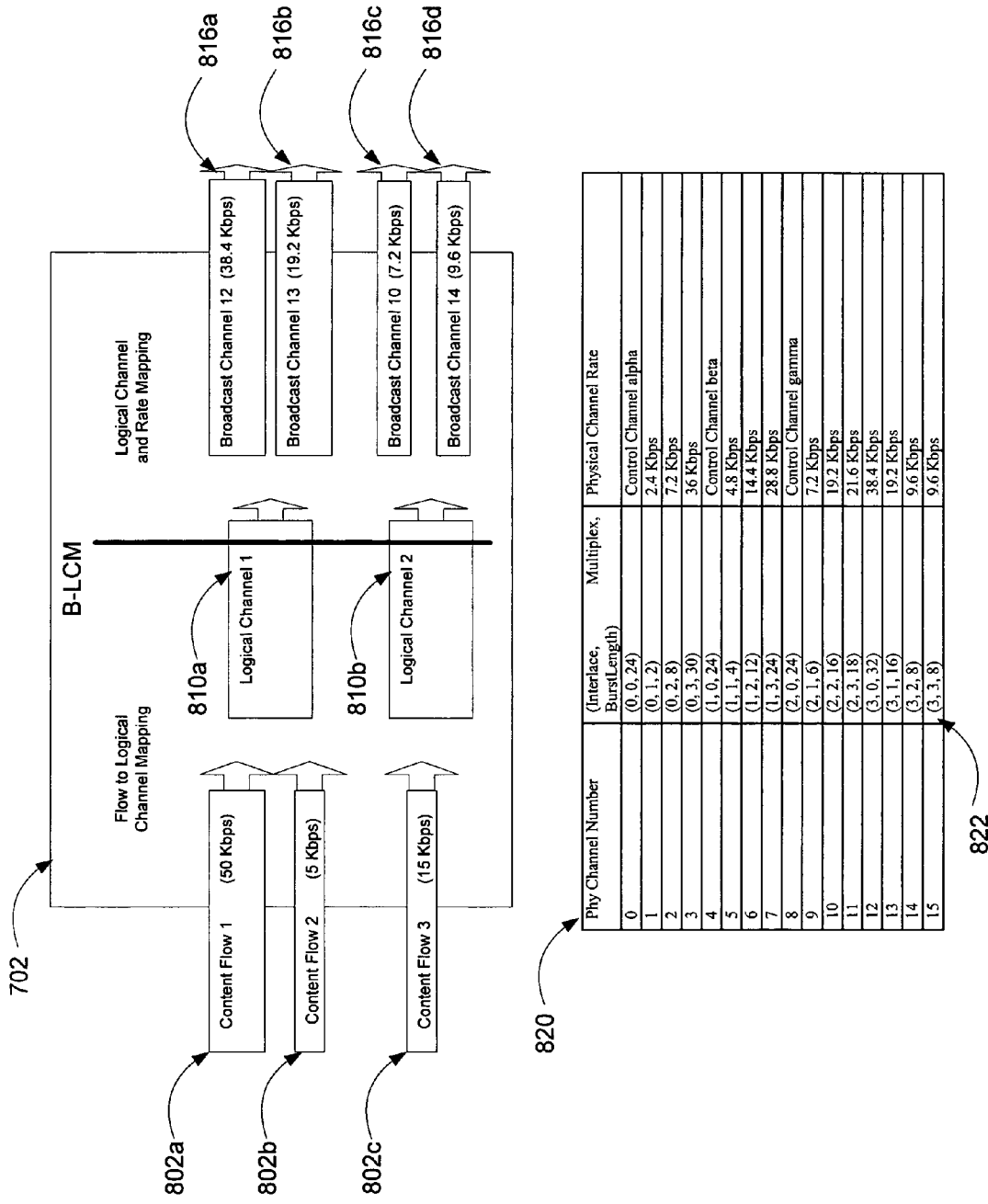
FIG. 8 is a block diagram of channel and rate management in a radio access network.

Flow to logical channel mapping involves assigning flows to logical channels. Each content stream is identified by a globally unique broadcast flow ID. FIG. 8 shows an example of three content flows 802a-c, with flow IDs of 1, 2 and 3. In this example, the B-LCM 702 maps the three flows into two logical channels 810a,b—channels 1 and 2. The word 'global' here implies all of a given BCMCS controller's footprint. Making the identifiers globally unique avoids the need to send a Broadcast Reset to the AT when it moves into a sector where the flow ID was being reused. One stream can be mapped to a single logical channel only, but multiple streams can be mapped to a single logical channel at the same time. The same stream can be mapped to different logical channels only across multiple CDMA carriers.

Flow to logical channel mapping is important when multiple flows are multiplexed onto the same logical channel (for example, one flow could be an audio stream and another flow could be a video stream for multimedia content). The Standard uses a program ID to identify related flows. The RAN may use other conventions to associate flows to logical channels, such as a 'fat pipe' approach that involves bundling flows into a larger logical channel. The tradeoff is between more granular logical channel management and AT battery and memory requirements. If too many flows are multiplexed into one logical channel, the AT will have to monitor and de-multiplex all the flows even if it is only interested in a single flow; imposing higher memory and processing requirements on the AT. However, by bundling multiple flows into a single logical channel, the RAN logical channel setup and management can be simplified.

Logical Channel Assignment

Logical channel assignment is the process of allocating logical channels to physical slots (interlace id, multiplex id, burst slot length). Referring still to FIG. 7, the B-LCM 702 can do logical channel assignment using information from the RNs 66-68 connected to it. In some examples, the B-LCM requests information about which of the available slots for each sector may be allocated to broadcast logical channels. Using that information, the B-LCM creates a mapping that would be acceptable to the (potentially dynamically changing) RN subset so that each RN has a channel assigned for every content flow that its ATs have requested. In order to simplify logical channel assignment, certain conventions can be enforced. Examples may include: using only one of the four interlaces (and always the same one) for Control Channel Sync Capsules on every sector; using the same number of multiplexes on each interlace, and using the same burst length for each multiplex. Pre-defining the physical broadcast channels on each sector may also reduce the complexity of this mapping process. It is recommended that the control channels corresponding to the different sectors of a RN be configured to have different interlaces to ensure that the synchronous control channels of the different sectors do not collide. Referring now to FIG. 8, an example is given where the B-LCM 702 has been informed that at least physical broadcast channels 10, 12, 13, and 14 (as configured in the pre-assigned set of physical broadcast channels 820) are available for assignment. As shown, the B-LCM could then assign logical channels 1 and 2 (810*a-b*) to the broadcast channels 816*a-d* in such a way as to satisfy the bandwidth requirements of both logical channels.

Rate Mapping

A function of a RAN that supports the 1×EV-DO Broadcast standard is rate mapping, which is related to logical channel mapping. The flow rates of the content need to be converted into suitable broadcast (over the air) bandwidth parameters. The issue is one of mapping a flow, which has a certain application-level bit rate, to physical-layer channels. As noted above, FIG. 8 shows two logical channels 810*a-b* being assigned to the broadcast channels 816*a-d* in such a way as to satisfy the bandwidth requirements of both logical channels. Generally, the increase in bandwidth between the application layer and the physical layer due to protocol overhead has to be accounted for.

The B-LCM 702 assigns a rate to a logical broadcast channel by mapping the logical channel to one or more physical slots by specification of <interlace id, multiplex id, burst slot length>. Each physical slot handles transmission at rates ranging from 38.4 kbps to 2.457 Mbps. By determining the periodicity of the physical slots assigned to the logical channel, and taking into account the physical rate, it is possible to compute the average rate assigned to the logical channel.

In some examples of the system, creating a rate-mapping scheme that covers most general cases may be simplified by imposing some reasonable constraints on the configuration of the physical broadcast channels. For instance, all the sectors of all the RNs on a network may be constrained to have the same (interlace, multiplex, burstlength) mapping at any time, reducing the number of possible rate-mappings. If the sum of all the multiplex burst lengths of a certain interlace is forced to equal 64, then reserving the first few slots of each control channel cycle for the control channel use may be simplified. The complexity of rate-mapping may be further reduced by constraining all the physical layer broadcast channels assigned to a logical broadcast channel to have the same slot rate and the same Reed-Solomon encoding. If these assumptions are made, a predefined but flexible physical channel configuration may be used by the B-LCM 702. For example, a set of thirteen (interlace, multiplex, burstlength) tuples 820 that would be common across all the sectors of all the RNs would be sufficient to provide a wide variety of rate/slot mapping policies. As illustrated in FIG. 8, a pre-assigned set of physical broadcast channels 820 is presented which assumes that the physical layer rate is set to 307.2 Kbps, and that the Reed Solomon code used is (16, 12, 4). The pre-assigned set of physical broadcast channels 820 also assumes that the first 24 slots of interlace 0, 1 and 2 are reserved for control channel traffic. To map a logical channel 810*a-b* into one or more physical channels, the B-LCM 702 can pack these tuples 822, each having a known bandwidth, with the content of the logical channels 810*a-b* as represented in the final mapping to physical slots 816*a-d*.

Once an (interlace, multiplex, burstlength) 3-tuple is defined and associated with a broadcast physical channel, the encoded rate supported by the broadcast physical channel is determined by the slot rate assigned to the broadcast channel. The average number of slots/second allocated to a physical channel associated with the tuple (I, m, B(I,m)) is given by the equation:

$$S(I,m)=(150*B(I, m)/[B(I,0)+B(I,1)+B(I,2)+B(I,3)]).$$

Thus the physical-layer (encoded) bit rate that can be supported by that physical channel at slot rate R equals R*S(I, m)*(slot duration).

Additional Channel Mapping Considerations—Soft Combining

Another consideration for BCMCS performance in the operator's network is that every user in the cell is expected to be able to receive the service. Accordingly, the focus is on designing in such a way that users at the edge of the cell receive good service. This is achieved by allowing the ATs to soft-combine signals received from neighboring sectors. Soft-combining allows a single AT to listen to the same information from more than one sector in order to do error correction or signal selection to improve reception quality. Referring now to FIG. 4, the AT 11 is receiving signals from two different sectors 406, 408 and soft-combining them. In order to implement soft-combining, a stream carried over a logical channel is transmitted to the AT on the same physical slots (in other words, the logical channel to physical slot mapping is the same) from all sectors that can be soft-combined. In addition, the rate assigned to the logical channel is the same for all sectors that can be soft-combined.

The AT monitors the broadcast channel (in addition to a control channel) even when the AT is dormant if it is interested in receiving broadcast content. This places an additional burden on the battery life (in the absence of BCMCS, the AT (while dormant) would only be monitoring the control channel in a slotted mode). This may be an additional consideration for the operator when deciding how many logical channels to support and how much broadcast content (and at what rate) to make available.

The implication of memory and battery life considerations is that it is not a good idea to multiplex too many flows into one logical channel (the 'fat pipe' approach), which would require the AT to monitor and de-multiplex all the flows even if it is only interested in a single flow; this would impose higher memory and processing requirements on the AT.

Redundancy Considerations

In some embodiments, a radio network service module (RNSM) card in the RNC is responsible for implementing the broadcast functionality. In the event the RNSM card fails for any reason, valuable time may be lost as the RNSM card has to re-do the flow and logical channel mapping in order to restore the broadcast functionality. To enable the system to respond quickly to such events, fault tolerance can be achieved by distributing broadcast functionality in a redundant manner among multiple RNSM cards in the RNC. For example, in some embodiments, two RNSM cards implement the broadcast functionality. When one RNSM card fails, its responsibility is quickly picked up by the other RNSM card so that end-user services are not affected. By distributing state information about channel assignments, and related information among the system elements, the system can recover from faults such as a reboot of the card that hosts the B-LCM.

Although the techniques described above employ the 1×EV-DO air interface standard, the techniques are also applicable to other CDMA and non-CDMA communications systems.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of implementations of the invention have been described. Nevertheless, it will be understood that various modifications may be made without departing from the spirit and scope of the invention, and, accordingly, other implementations are within the scope of the following claims. For example, some or all of the BSN functionality may be implemented in the BCMCS controller 32.

What is claimed is:

1. A method performed on a radio network controller, the method comprising:
   multicasting information from a radio network controller in a radio access network to radio nodes in the radio access network, the information comprising:
      content flows received by the radio network controller from a content server, the content flows being for broadcast by the radio nodes to mobile access terminals; and
      an overhead message configured to be transmitted in one or more sectors of the radio nodes, the overhead message being further configured to enable one or more mobile access terminals to access the content flows, the overhead message being configured using neighboring sector information from neighboring sectors of the radio access network to determine which content flows may be available to the mobile access terminals communicating with particular radio nodes of the radio nodes;
   wherein the multicasting comprises:
      distributing the content flows to the radio nodes using multicast network addresses corresponding to the content flows; and
      managing distribution of the content flows to the radio nodes using a broadcast logical channel management function to allocate the content flows to broadcast logical channels; and
      instructing one or more of the radio nodes to modify a list of soft-combinable sectors for one or more of the content flows.

2. The method of claim 1, wherein multicasting comprises IP multicasting.

3. The method of claim 1, further comprising:
broadcasting the information as one or more broadcast signals from the radio nodes to the mobile access terminals.

4. The method of claim 1, wherein the radio access network comprises a 1xEV-DO network.

5. The method of claim 3, further comprising:
enabling configuration of broadcasting of the information.

6. The method of claim 5, wherein enabling configuration comprises:
enabling configuration of at least one of a set comprising a time of flow of the information, a place of the information, flow parameters of the information, and quality of service of the information.

7. The method of claim 1, wherein the at least some other broadcast-multicast service functions comprise broadcast serving node functions performed by the radio network controller without requiring a broadcast-capable packet data serving node.

8. The method of claim 7, wherein the broadcast serving node functions comprise one or more of the following: preparation of the content flows, attaching Point-to-Point Protocol headers, attaching Frame Check sequence (FCS) trailers, implementing Broadcast Framing Protocol, implementing Broadcast Security Protocol, implementing Broadcast MAC Protocol, and addition of Reed-Solomon Error detection coding to the content flows.

9. The method of claim 1, wherein the some broadcast-multicast service functions performed by the broadcast-multicast service controller comprise at least one of a set comprising logical channel management, broadcast framing, MAC protocols, security protocols and time-of-transmission calculation.

10. The method of claim 3, further comprising:
in a mobile access terminal of the mobile access terminals, enabling soft-combination of the one or more broadcast signals across a footprint of the radio network controller and a footprint of another radio network controller in the radio access network as the mobile access terminal moves across sectors that are served by radio nodes of the radio nodes of the radio access network that are homed to different ones of the radio network controllers.

11. The method of claim 1, wherein the at least some other broadcast-multicast service functions performed by the radio network controller comprise at least one of a set comprising logical channel management, broadcast framing, MAC protocols, security protocols and time-of-transmission calculation.

12. The method of claim 1, wherein managing the distribution of the content flows comprises:
managing the distribution of the content flows to the radio nodes using the broadcast logical channel management function to assign the broadcast logical channels to which the content flows have been allocated to physical channels.

13. The method of claim 1, wherein the broadcast logical channel management function uses statistics about slot usage on individual sectors of the radio access network to create broadcast channels and to allocate the content flows to the broadcast channels in a substantially optimal manner.

14. The method of claim 1, wherein distributing the content flows to the radio nodes comprises:
operating a signaling protocol between the radio network controller and the radio nodes, the signaling protocol comprising a combination of IP Multicast and IP Unicast.

15. The method of claim 14, further comprising:
sending a signal to the radio nodes using the signaling protocol to enable the management of the broadcast logical channels.

16. The method of claim 15, wherein the signal is one of a set comprising creating, modifying, or deleting a broadcast logical channel of the broadcast logical channels.

17. The method of claim 1, further comprising:
using neighboring sector information from neighboring sectors of the radio access network to make a determination about which content flows may be available to the mobile access terminals communicating with particular radio nodes of the radio nodes.

18. The method of claim 17, further comprising:
producing broadcast overhead messages using the neighboring sector information and sending the broadcast overhead messages to the radio nodes.

19. The method of claim 1, wherein the radio network controller comprises multiple radio network service module processors, and wherein the at least some other broadcast-multicast service functions are distributed in a redundant manner among the multiple radio network service module processors.

20. A system, comprising:
radio nodes in a radio access network; and
a radio network controller in the radio access network, the radio network controller configured to:
multicast information to the radio nodes, the information comprising:
content flows received by the radio network controller from a content server, the content flows being for broadcast by the radio nodes to mobile access terminals; and
an overhead message configured to be transmitted in one or more sectors of the radio nodes, the overhead message being further configured to enable one or more mobile access terminals to access the content flows, the overhead message being configured using neighboring sector information from neighboring sectors of the radio access network to determine which content flows may be available to the mobile access terminals communicating with particular radio nodes of the radio nodes;
wherein the radio network controller comprises:
memory configured to store instructions for execution; and
one or more machines configured to execute the instructions, the instructions for causing the one or more machines to:
distribute the content flows to the radio nodes using multicast network addresses corresponding to the content flows; and
manage distribution of the content flows to the radio nodes using a broadcast logical channel management function to allocate the content flows to broadcast logical channels; and
instruct one or more of the radio nodes to modify a list of soft-combinable sectors for one or more of the content flows.

21. The system of claim 20, wherein the at least some other broadcast-multicast service functions comprise broadcast serving node functions performed by the radio network controller without requiring a broadcast-capable packet data serving node.

22. The system of claim 21, wherein the broadcast serving node functions comprise one or more of the following:
preparation of the content flows, attaching Point-to-Point Protocol headers, attaching Frame Check sequence (FCS) trailers, implementing Broadcast Framing Protocol, implementing Broadcast Security Protocol, implementing Broadcast MAC Protocol, and addition of Reed-Solomon Error detection coding to the content flows.

23. The system of claim 20, wherein managing the distribution of the content flows comprises:
managing the distribution of the content flows to the radio nodes using the broadcast logical channel management function to assign the broadcast logical channels to which the content flows have been allocated to physical channels.

24. The system of claim 20, wherein distributing the content flows to the radio nodes comprises:
operating a signaling protocol between the radio network controller and the radio nodes, the signaling protocol comprising a combination of IP Multicast and IP Unicast.

25. The system of claim 20, wherein distributing the content flows to the radio nodes comprises:
operating a signaling protocol between the radio network controller and the radio nodes, the signaling protocol comprising a combination of IP Multicast and IP Unicast.

26. One or more computer-readable media configured to store instructions for causing one or more machines to:
multicast information from a radio network controller in a radio access network to radio nodes in the radio access network, the one or more computer-readable media comprising one or more tangible media, the information comprising:
content flows received by the radio network controller from a content server, the content flows being for broadcast by the radio nodes to mobile access terminals; and
an overhead message configured to be transmitted in one or more sectors of the radio nodes, the overhead message being further configured to enable one or more mobile access terminals to access the content flows, the overhead message being configured using neighboring sector information from neighboring sectors of the radio access network to determine which content flows may be available to the mobile access terminals communicating with particular radio nodes of the radio nodes;
wherein multicasting comprises:
distributing the content flows to the radio nodes using multicast network addresses corresponding to the content flows; and
managing distribution of the content flows to the radio nodes using a broadcast logical channel management function to allocate the content flows to broadcast logical channels; and
instruct one or more of the radio nodes to modify a list of soft-combinable sectors for one or more of the content flows.

27. The one or more computer-readable media of claim 26, wherein the at least some other broadcast-multicast service functions comprise broadcast serving node functions performed by the radio network controller without requiring a broadcast-capable packet data serving node.

28. The one or more computer-readable media of claim 27, wherein the broadcast serving node functions comprise one or more of the following: preparation of the content flows, attaching Point-to-Point Protocol headers, attaching Frame Check sequence (FCS) trailers, implementing Broadcast Framing Protocol, implementing Broadcast Security Protocol, implementing Broadcast MAC Protocol, and addition of Reed-Solomon Error detection coding to the content flows.

29. The one or more computer-readable media of claim 27, wherein managing the distribution of the content flows comprises:
managing the distribution of the content flows to the radio nodes using the broadcast logical channel management function to assign the broadcast logical channels to which the content flows have been allocated to physical channels.

* * * * *

UNITED STATES PATENT AND TRADEMARK OFFICE
CERTIFICATE OF CORRECTION

PATENT NO. : 8,295,818 B2  
APPLICATION NO. : 11/229180  
DATED : October 23, 2012  
INVENTOR(S) : Palnati et al.

Page 1 of 1

It is certified that error appears in the above-identified patent and that said Letters Patent is hereby corrected as shown below:

Title Page, Column 2 (Other Publications), Line 1, delete "Bandwith-Efficient" and insert -- Bandwidth-Efficient --, therefor.

Signed and Sealed this
Thirtieth Day of April, 2013

Teresa Stanek Rea
*Acting Director of the United States Patent and Trademark Office*